United States Patent [19]

Gansen et al.

[11] Patent Number: 5,750,583
[45] Date of Patent: May 12, 1998

[54] PROCESS FOR THE PRODUCTION OF MOLDED POLYURETHANE PRODUCTS

[75] Inventors: Peter Gansen, Pittsburgh; James R. Gricar, Washington, both of Pa.

[73] Assignee: Bayer Corporation, Pittsburgh, Pa.

[21] Appl. No.: 864,169

[22] Filed: May 28, 1997

[51] Int. Cl.$^6$ .................. C08G 18/48; C08J 9/00
[52] U.S. Cl. .................. 521/78; 521/159; 521/174; 528/67; 528/76; 528/77
[58] Field of Search .................. 521/159, 174, 521/78; 528/67, 76, 77

[56] References Cited

U.S. PATENT DOCUMENTS

| | | | |
|---|---|---|---|
| 4,945,117 | 7/1990 | Gansen et al. | 521/99 |
| 4,972,004 | 11/1990 | Randall et al. | 521/159 |
| 5,070,114 | 12/1991 | Watts et al. | 521/159 |
| 5,314,928 | 5/1994 | Verhelst | 521/159 |
| 5,350,778 | 9/1994 | Steppan et al. | 521/159 |
| 5,374,667 | 12/1994 | Hinz et al. | 521/159 |
| 5,418,259 | 5/1995 | Broos et al. | 521/159 |
| 5,426,126 | 6/1995 | Gebauer et al. | 521/131 |
| 5,439,948 | 8/1995 | De Vos et al. | 521/159 |

*Primary Examiner*—Morton Foelak
*Attorney, Agent, or Firm*—Joseph C. Gil; N. Denise Brown

[57] ABSTRACT

The present invention is directed to a process for the preparation of a molded product. The method requires the introduction of a polyurethane foam forming reaction mixture into a mold. The present invention is directed to the use of a specific semi-rigid foam formulation which avoid problems associated with void formation in instrument panels.

16 Claims, No Drawings

PROCESS FOR THE PRODUCTION OF MOLDED POLYURETHANE PRODUCTS

BACKGROUND OF THE INVENTION

The production of semi-rigid polyurethanes (e.g., in producing automotive instrument panels) is well known in the art. As is known in the art, such products are typically prepared by placing a plastic film or sheet (such as polyvinylchloride ("PVC") or acrylonitrile/butadiene/styrene ("ABS")) and a retainer in a mold, spraying or pouring a polyurethane reaction mixture over the film or sheet in an amount sufficient to fill the mold, closing the mold, allowing the mixture to fully react and removing the resultant product from the mold. One problem with many polyurethane formulations used to date is the formation of voids between the film or sheet and the foam.

Prepolymers based on polymethylene poly(phenyl isocyanate) are known in the art. Such prepolymers have been described as being useful in the preparation of rigid polyurethane foams (see, e.g., U.S. Pat. Nos. 4,972,004, 5,426,126 and 5,439,948), flexible polyurethane foams (see, e.g., U.S. Pat. Nos. 5,070,114 and 5,314,928), reaction injection molded elastomers (see, e.g., U.S. Pat. No. 5,350,778), and microcellular polyurethanes (see, e.g., U.S. Pat. No. 5,418,259). In addition, prepolymers similar to those used in the present invention have been described as useful in preparing flexible polyurethane foams (see, e.g., U.S. Pat. Nos. 4,945,117 and 5,374,667) and integral skin polyurethane foams (see, e.g., U.S. Pat. No. 4,945,117). However, none of these references describe the preparation of a semi-rigid product formed by foaming behind (or over) a plastic film or sheet. Certainly, none of the references indicate how the void formation problems associated with the preparation of such products could be eliminated.

The object of the present invention was to develop a formulation for use in the production of semi-rigid polyurethane foams which did not suffer from the void formation problem noted above.

DESCRIPTION OF THE INVENTION

The present invention is therefore directed to an improved process for the preparation of a molded semi-rigid polyurethane product comprising:

a) positioning a plastic film or sheet and a retainer in a mold, b) spraying or pouring a polyurethane forming reaction mixture over said film or sheet in an amount sufficient to fill the mold, c) closing the mold, d) allowing said reaction mixture to fully react, and e) removing the resultant product from the mold.

The improvement resides in the specific reaction mixture used. The reaction mixture comprises A) an isocyanate reactive mixture comprising:
  i) from 70 to 95%, preferably from 85 to 92% by weight of a long chain polyether polyol,
  ii) from 1.5 to 4.0%, preferably from 2.0 to 3.5% by weight of water,
  iii) from 0.5 to 15%, preferably from 1.0 to 5% by weight of a crosslinker,
  and, optionally,
  iv) from 0 to 2%, preferably from 0 to 0.8% by weight of one or more catalysts,
  and, optionally,
  v) auxiliary materials and/or additives, wherein said %s by weight are based upon the total weight of component A), and B) a polyisocyanate prepolymer having a functionality of less than about 2.8, an isocyanate group content of 20 to 30%, and a urethane group content of from about 0.1 to 3.2%, and comprises polymethylene poly-(phenylisocyanate), from about 26 to 52% of 4,4'-methylene bis(phenyl-isocyanate), and from about 8 to 27% of 2,2'- and 2,4'-methylene bis(phenylisocyanate), with the amounts of components A) and B) being such that the isocyanate index of the reaction mixture is from 80 to 110, preferably from 90 to 100.

Suitable polyisocyanate prepolymers generally have a viscosity of less than 300 mPa•s at 25° C. These polyisocyanate prepolymers can be prepared by several ways as set forth herein. It is preferred that the functionality of these polyisocyanate prepolymers range from about 2.1 to than about 2.8, preferably from about 2.2 to less than about 2.4. The functionality of the polyisocyanate prepolymer is dictated by the relative amounts of methylene bis(phenyl-isocyanate) monomers and by the relative amounts and average functionalities of not only polymethylene poly (phenylisocyanate) but also of the urethane-containing species.

The urethane group content as used herein is defined as:

$$\% \text{ urethane} = \frac{59 \times (\text{OH equivalents}) \times 100}{\text{total weight}}$$

In another embodiment of the present invention, the process for the preparation of a molded semi-rigid polyurethane product comprises:

a) positioning a plastic film or sheet and a retainer in a mold, b) closing the mold, c) injecting a polyurethane forming reaction mixture between the retainer and the plastic film or sheet in an amount at least sufficient to fill the mold;

d) allowing said reaction mixture to fully react, and e) removing the resultant product from the mold.

This embodiment requires the same specific reaction mixture as is identified above.

The isocyanate reactive mixture A) of the present invention includes long chain polyether polyols. Such polyether polyols are typically relatively high molecular weight compounds having an average functionality of from about 1 to about 6, preferably about 2 to about 3. These materials are known in the field of polyurethane chemistry.

Suitable relatively high molecular weight polyether polyols include those conventionally used in polyurethane chemistry. Suitable polyether polyols typically have molecular weights in the range of from about 1,100 to about 8,000, preferably about 3,000 to about 7,000, more preferably about 4,000 to about 6,000.

Suitable polyethers are known and may be prepared, for example, by the polymerization of epoxides, optionally in the presence of a catalyst such as $BF_3$, or by chemical addition of such epoxides, optionally as mixtures or successively, to starting components containing reactive hydrogen atoms. Suitable epoxides include ethylene oxide, propylene oxide, butylene oxide, tetrahydrofuran, styrene oxide, or epichlorohydrin. Suitable starter components include water, alcohols, or amines, including, for example, ethylene glycol, 1,2- or 1,3-propanediol, 1,2-, 1,3-, or 1,4- butanediol, trimethylolpropane, 4,4'-dihydroxydiphenylpropane, aniline, ammonia and ethanolamine. Polyethers that contain predominantly primary hydroxyl groups (up to about 90% by weight, based on all of the hydroxyl groups in the polyether) are also often preferred. Polyethers modified by vinyl polymers of the kind obtained, for example, by the polymerization of styrene and acrylonitrile in the presence of polyethers (e.g., U.S. Pat. Nos. 3,383,351, 3,304,273, 3,523,093, and 3,110,695 and German Patent 1,152,536) are also suitable, as are polybutadienes containing hydroxyl groups. Particularly preferred polyethers include polyoxyalkylene polyethers, such as polyoxyethylene diol, polyoxypropylene diol, polyoxybutylene diol, and polytetramethylene diol.

Polyethers in which polyadducts or polycondensates or polymers are present in a finely dispersed or dissolved form may also be used according to the invention. Polyethers of this type may be obtained, for example, by carrying out polyaddition reactions (e.g., reactions between polyisocyanates and amino functional compounds) or polycondensation reactions (e.g., between formaldehyde and phenols or amines) in situ in the above-mentioned hydroxyl-containing compounds. Processes of this type are described, for example, in German Auslegeschrifts 1,168,075 and 1,260,142 and German Offenlegungsschrifts 2,324,134, 2,423,984, 2,512,385, 2,513,815, 2,550,796, 2,550,797, 2,550,833, 2,550,862, 2,633,293, and 2,639,254.

General discussions of representative polyethers that may be used according to the present invention can be found, for example, in *Polyurethanes, Chemistry and Technology*, edited by Saunders and Frisch, Interscience Publishers, New York, London, Volume I, 1962, pages 32–42 and pages 44–54, and Volume II, 1964, pages 5–6 and 198–199, and in *Kunststoff-Handbuch*, Volume VII, edited by Vieweg and H öchtlen, Carl-Hanser-Verlag, Munich, 1966, on pages 45–71.

It is also necessary to include crosslinkers in the isocyanate reactive mixture. Such crosslinkers include relatively low molecular weight (i.e., having molecular weights of 450 or less) hydroxyl group containing compounds. Suitable low molecular weight hydroxy functional materials are also known in the art. Such compounds have from two to four hydroxyl groups and have molecular weights of from 32 to 450. Examples of useful hydroxyl containing compounds include glycols and triols, such as 1,2-ethanediol, 1,2- and 1,3-propylene glycol, 1,4- and 2,3-butylene glycol, 1,6-hexane-diol, 1,8-octanediol, neopentyl glycol, cyclohexanedimethanol, 1-methyl-1,3-propanediol, 2-methyl-1,3-propanediol, glycerol, trimethylolpropane, 1,2,6-hexanetriol, 1,2,4-butanetriol, and trimethylolethane; and, dialkanol amines, such as diethanol amine. Also useful are reaction products of alkylene oxides (such as ethylene and propylene oxides) and i) any of the above glycols and triols, ii) pentaerythritol, aromatic and/or aliphatic diamines (such as ethylene diamine and tolylene diamine), or iii) monoalkanol-, dialkanol-, or trialkanolamines. Also useful as crosslinkers are sterically hindered aromatic diamines which contain at least one linear or branched alkyl substituents containing 1 to 4 carbon atoms in the ortho-position to the first amino group and at least one (and preferably two) linear or branched alkyl substituents containing 1 to 4 carbon atoms in the ortho-position to the second amino group. Such amines are known and used in the polyurethane reaction injection molding ("RIM") process. Examples of useful amines include 3,3'-dimethyl4,4'-diaminodiphenylmethane, 1-methyl-3,5-bis(methylthio)-2,4- and/or -2,6-diaminobenzene, 1,3,5-triethyl-2,4-diaminobenzene, 1,3,5-trimethyl-2,4-diaminobenzene, 1,3,5-triisopropyl-2,4-diaminobenzene, 1-methyl-3,5-diethyl-2,4- and/or -2,6-diaminobenzene, 4,6-dimethyl-2-ethyl-1,3-diaminobenzene, 3,5,3',5'-tetraethyl-4,4'-diaminodiphenylmethane, 3,5,3',5'-tetraisopropyl4,4'-diaminodiphenyl-methane, and 3,5-diethyl-3',5'-diisopropyl-4,4'-diaminodiphenylmethane. The crosslinkers may, of course, also be used as mixtures. Alkanolamines are preferably used as crosslinkers.

The polyisocyanate prepolymers of the present invention have an isocyanate group content of from 20 to 30%, preferably from 26 to 29% by weight. These polyisocyanate prepolymers comprise polymethylene poly(phenyl isocyanate), from about 26 to about 52% of 4,4'-methylene bis(phenyl-isocyanate) and from about 8 to about 27% by weight of 2,2'- and 2,4'-methylene bis(phenyl-isocyanate). These prepolymers have functionalities of less than 2.8, and a urethane group content of about 0.1 to about 3.2%. Suitable polymethylene poly(phenyl isocyanates) used to prepare these prepolymers include, for example, those having a total monomer content of 45% to 80%, with the balance being higher ring polyisocyanates. Of the 45% to 80% monomer, 0 to 3% is the 2,2'-isomer, 10 to 25% is the 2,4'-isomer and 33 to 55% is the 4,4'-isomer.

It is possible to prepare the isocyanate prepolymers of the present invention, for example, by mixing (i) polymethylene poly(phenylisocyanate) having a monomer content of 45 to 80% wherein from about 0 to about 3% is the 2,2'-isomer, from about 10 to about 25% is the 2,4'-isomer and from about 33 to about 55% is the 4,4'-isomer, with (ii) an organic compound having an average functionality of from 2.0 to 4.0, preferably 2 to 3.0, preferably having a molecular weight of >1000, and being selected from the group consisting of diols, triols and tetraols. It is also possible to use mixtures of diols, triols, and/or tetraols with monoalcohols, provided that the average functionality falls within the above ranges.

Suitable polyether polyols for preparing the isocyanate as described hereinabove include, for example, compounds having an average hydroxyl functionality of from 2 to 4 and an OH number of from 20 to 100. The polyether diols, triols and tetrols used to produce the isocyanate products of the present invention are known in the polyurethane art. They are obtained, for example, by polymerizing epoxides such as ethylene oxide, propylene oxide, butylene oxide, tetrahydrofuran, styrene oxide, or epichlorohydrin in the presence of BF₃ or by chemically adding these epoxides, preferably ethylene oxide and propylene oxide, in admixture or successively to components containing reactive hydrogen atoms such as water or alcohols, or amines. Examples of suitable alcohols include ethylene glycol, 1,2- and 1,3-propanediol, 1,3- and 1,4- and 2,3-butane-diol, 1,6-hexanediol, 1,10-decanediol, diethylene glycol, triethylene glycol, tetraethylene glycol, dipropylene glycol, tripropylene glycol, glycerol, pentaerythritol and trimethylolpropane. Preferred polyether polyols prepared from initiators selected from the group consisting of triols and diols, with propylene oxide as the main component and which optionally have an EO-tip of less than 20%. A most preferred polyether diol is based upon propylene glycol and propylene oxide. A most preferred polyether triol is based upon glycerol, propylene oxide and ethylene oxide.

The polyether polyols are incorporated into the polyisocyanate prepolymers in the form of urethane-containing adducts. These urethane-containing adducts are present in the polyisocyanate prepolymers in an amount necessary to assure compatibility of the reacting mixture of the polyols and polyisocyanates in the process according to the present invention, such that the urethane content of the polyisocyanate prepolymers is from about 0.1 to 3.2%.

Another suitable polyisocyanate prepolymer can be obtained, for example by reacting i) a mixture of
  1) 4,4'-methylene bis(phenyl isocyanate)
  and
  2) a polymethylene poly(phenyl isocyanate) having an isocyanate group content of from about 31 to about 32.5% (preferably from about 31.5 to about 32.5%) by weight and consisting of:
    a) from about 10 to about 25%, preferably from 14 to 22% by weight of 2,4'-MDI,
    b) from about 0 to about 3%, preferably from 1 to 2.5% by weight of 2,2'-MDI,
    c) from about 33 to about 55%, preferably from 33 to 47% by weight of 4,4'-MDI and
    d) from about 27 to about 55%, preferably from 32 to 45% by weight of higher homologues, with the total weight of a), b), c) and d) being 100%,
and
ii) a polyether polyol having an average hydroxyl functionality of from 2 to 4 and an OH number of from 20 to 100, preferably from 28 to 50.

In commercial processes used to prepare methylene bis (phenylisocyanate), mixtures of the aniline/formaldehyde condensation products are phosgenated and then the monomeric two ring adducts are at least partially removed from the polymethylene poly(phenylisocyanate) mixture, most commonly by distillation. By varying the processing conditions, the ratio of aniline to formaldehyde, and the level and type of acid catalyst used for the condensation, mixtures of the various two ring isomers, i.e., the 2,2'-, 2,4'-, and 4,4'-methylene bis(phenylamine), and the various positional isomers of the higher ring polyamine oligomers can be controlled. Thus, the phosgenated mixture can be tailored to be enriched in the relative amounts of monomeric two ring diisocyanates compared to higher ring polyisocyanates. In this manner, it is also possible to obtain mixtures that contain a relatively high amount of the less reactive ortho-substituted two ring and higher ring polyisocyanates. Mixtures of the 4,4'-, 2,4'-, and 2,2'-methylene bis (phenylisocyanate) monomers that are enriched in the 2,4'- and 2,2'-isomer can also be separated from these phosgenated mixtures by distillation. Alternatively, mixtures of the two ring diisocyanates and higher ring polyisocyanates can be produced directly having desirable viscosity, isomer ratio, and reactivity characteristics. By higher ring polyisocyanates, it is meant three-ring or higher products derived by the phosgenation of aniline-formaldehyde condensation products. These are also commonly known as polymeric MDI, and may be referred to as derivatives of MDI. Known processes for preparing such isocyanates are described, e.g., in U.S. Pat. Nos. 2,683,730, 2,950,263, 3,012,008, 3,344,162 and 3,362,979, the disclosures of which is herein incorporated by reference.

The resultant isocyanate mixture is then reacted with a polyether polyol having an average hydroxyl functionality of from 2 to 4 and an OH number of from 20 to 100. The polyether diols, triols and tetrols used to produce the isocyanate products of the present invention are known in the polyurethane art. They are obtained, for example, by polymerizing epoxides such as ethylene oxide, propylene oxide, butylene oxide, tetrahydrofuran, styrene oxide, or epichlorohydrin in the presence of $BF_3$ or by chemically adding these epoxides, preferably ethylene oxide and propylene oxide, in admixture or successively to components containing reactive hydrogen atoms such as water or alcohols, or amines. Examples of suitable alcohols include ethylene glycol, 1,2- and 1,3-propanediol, 1,3- and 1,4- and 2,3-butane-diol, 1,6-hexanediol, 1,10-decanediol, diethylene glycol, triethylene glycol, tetraethylene glycol, dipropylene glycol, tripropylene glycol, glycerol, pentaerythritol and trimethylolpropane. Preferred polyethers are triols and diols with propylene oxide as the main component with optionally having an EO-tip of less than 20%. A most preferred polyether diol is based upon propylene glycol and propylene oxide. A most preferred polyether triol is based upon glycerol, propylene oxide and ethylene oxide.

Water must also be present in the isocyanate-reactive mixture, component A), in an amount of from 1.5 to 4.0 parts by weight.

The amounts of the reactive components are such that the isocyanate index of the reaction mixture is from 80 to 110, preferably from 90 to 100.

Auxiliary agents and additives may optionally also be used in the process of the invention. Suitable auxiliary agents and additives include, for example, surface-active additives, cell regulators, pigments, dyes, UV stabilizers, plasticizers, fungistatic or bacteriostatic substances, and fillers, such as those described in European Patent Application 81,701 at column 6, line 40, to column 9, line 31.

Silicone surfactants may also be used (generally in amounts of from about 0.05 to about 1.0% by weight, based upon the total weight of all the isocyanate-reactive components in the reaction mixture). These are known in the art. Polyether siloxanes are particularly suitable silicone surfactants; especially useful are those which are water soluble. These compounds generally have a polydimethyl siloxane group attached to a copolymer of ethylene oxide and propylene oxide. Foam stabilizers of this kind are known and have been described, for example, in U.S. Pat. Nos. 2,834, 748, 2,917,480 and 3,629,308. Also useful are the known polysiloxane surfactants generally used in the polyurethane art.

The reaction mixture can also contain catalysts for catalyzing the reaction between isocyanate groups and hydroxyl groups (i.e., a urethane catalyst). The urethane catalysts are generally known and include tertiary amines such as triethylamine, tributylamine, N-methyl-morpholine, N-ethylmorpholine, N-cocomorpholine, N,N,N',N"-tetramethyl-ethylenediamine, 1,4-diaza-bicyclo-(2.2.2)-octane, N-methyl-N'-dimethyl-aminoethylpiperazine, N,N-dimethylbenzylamine, bis-(N,N-diethyl-aminoethyl)-adipate, N,N-diethylbenzylamine, pentamethyl-diethylene-triamine, N,N-dimethyl-cyclohexylamine, N,N,N', N'-tetramethyl-1,3-butanediamine, N,N-dimethyl-β-phenylethylamine 1,2-dimethylimidazole, 2-methylimidazole, m-aminoaniline, N,N-dimethylaminoethanol, 2(2-dimethylamino-ethoxy)-ethanol, N,N,N',N',N"-pentamethyldipropylene-diamine, N,N-dimethylamino-N"-methylaminoethanol, 2,2-N-dimethyl-6-N-methyl-2,6-diazanonanal and the like. Also useful are the commercially available tertiary amines such as Niax AI and Niax AI07, available from Union Carbide; Thancat DD, available from Texaco; and the like. Mannich bases known per se obtained from secondary amines such as dimethylamine and aldehydes, preferably formaldehyde, or ketones such as acetone, methyl ethyl ketone or cyclohexanone and phenols such as nonylphenol or bisphenol may also be used as catalysts. Silaamines having carbon-silicon bonds as described, e.g., in German Patent 1,229,290 and U.S. Pat. No. 3,620,984 may also be used as catalysts. Examples include 2,2,4-trimethyl-2-silamorpholine and 1,3-diethylaminoethyltetramethyidisiloxane.

Organic tin compounds may also be used as catalysts according to the invention. The organic tin compounds used are preferably tin(II) salts of carboxylic acids such as tin(II) acetate, tin(II) octoate, tin(II) ethyl hexoate and tin(II) laurate and tin(IV) compounds such as dibutyl tin oxide, dibutyl tin dichloride, dibutyl tin diacetate, dibutyl tin dilaurate, dibutyl tin maleate or dioctyl tin diacetate. All the above-mentioned catalysts may, of course, be used as mixtures.

According to the invention, the components may be reacted together by known processes often using mechanical devices such as those described in U.S. Pat. No. 2,764,565. Details concerning processing apparatus which may be used according to the invention may be found in Kunststoff-Handbuch, Volume VII, published by Vieweg and H öchtlen, Carl-Hanser-Verlag, Munich, 1966, pages 121 and 205.

The foaming reaction for producing foam products is carried out inside molds. In the process of the invention, a plastic film or sheet of a material such as, for example, PVC, ASA, ABS/PVC, or polyurethane, is preferably placed in the bottom of a mold. A retainer is also placed in the mold. The foamable reaction mixture is introduced into the mold which may be made of a metal such as aluminum or a plastics material such as an epoxide resin. The reaction mixture foams up inside the mold to produce the shaped product.

The retainer provides rigidity to the molded part and a means for attaching the final molded product, such as, for example, an instrument panel, to an automobile. The retainer may be attached to the lid of the mold by locking pins when the molded part is open poured, or it can be placed into the cavity of the mold after the skin is loaded in a closed molding process. Suitable retainers can be made of various materials. Suitable materials include, for example, aluminum, steel, SMA, ABS, PP and various copolymers. The material from which the retainer is made typically varies with application and/or end product use, such as, for example, car make and model.

The problem of voids forming between the film and the foam is substantially eliminated by using the formulation described.

As used herein, the term molecular weight refers to the number average molecular weight (Mn), as determined by end group analysis (i.e. OH number).

The invention is further illustrated but is not intended to be limited by the following examples in which all parts and percentages are by weight unless otherwise specified.

EXAMPLES

The following components were used in the Examples:

Iso A: a prepolymer prepared by mixing 96 parts by weight of a polymethylene poly(phenylisocyanate) having a monomer content of about 45% wherein the monomer comprises about 42.5% of the 4,4'-isomer and about 2.5% of the 2,4'-isomer, with 4 parts by weight of Polyol F at room temperature. This prepolymer had an NCO group content of about 29.5%.

Iso B: a polymethylene poly(phenylisocyanate) having an NCO content of about 32% by weight and a monomeric diisocyanate content of about 57% by weight, wherein about 42% is the 4,4'-isomer, about 13% is the 2,4'-isomer, and about 2% is the 2,2'-isomer. This isocyanate contains about 43% by weight of higher ring polyisocyanate compounds.

Iso C: a prepolymer prepared by mixing 350 grams of Polyol A with 2000 grams of Iso B at room temperature. The blend was stirred for one hour and used after 24 hours. This prepolymer had an NCO group content of about 27.2%.

Polyol A: a glycerine started propylene oxide/ethylene oxide (wt. ratio=87%:13%) polyether polyol having an OH number of about 35

Polyol B: a glycerine started propylene oxide/ethylene oxide (wt. ratio=87%:13%) polyether polyol having an OH number of about 28

Polyol C: a propylene glycol started propylene oxide/ ethylene oxide (wt. ratio=80%:20%) polyether polyol having an OH number of about 28

Polyol D: a glycerine/water (wt. ratio=98.9%:1.1%) started propylene oxide/ethylene oxide (wt. ratio= 27.3%:62.7%) ethylene oxide terminated (10%) polyether polyol having an OH number of about 37

Polyol E: an ethylene diamine started propylene oxide polyether polyol having an OH number of about 630

Polyol F: a methyl phthalate, DEG polyester having an OH number of about 340, a functionality of about 1.9, an acid number of about 1.5 and a viscosity of about 2,500 cps at 25° C.

Polyol G: a polyester prepared from trimethylolpropane/ adipic acid/1,6-hexanediol/1,2-propylene glycol, and having an OH number of about 100.

Polyol H: amino crotonate of trimethylolpropane started PO polyether having an amine number of 330; a catalytic crosslinker. This compound was prepared according to the process described in U.S. Pat. No. 5,482,979, the disclosure of which is herein incorporated by reference.

AA 1: a mixture consisting of 15% by wt. of diethanolamine and 15% by wt. of water Gly: glycerine CAT 1: Bis (dimethyl amine propyl) urea; Desmorapid TPPU 3244 catalyst.

CAT 2: a 70% solution of [bis (dimethyl amino ethyl) ether] in 30% dipropylene glycol, commercially available as Niax A-1 from OSi.

CAT 3: dimethyl tin laurate, a catalyst commercially available as Fomrez UL28 from Witco.

ADD 1: a 50:50 mixture of Polyol G and a plasticizer (i.e. benzyl butyl phthalate).

ADD 2: an epoxidized soybean oil emulsifier; commercially available as Plaschek 775 from Ferro Corp.

ADD 3: nonylphenoxypoly(ethyleneoxy)ethanol; a commercially available emulsifier from Rhone-Poulenc (Igepol 630).

Pigment A: a mixture of 14% by weight carbon black in 86% by weight of Polyol A

The two polyol formulations described below were used in the examples of this invention.

| Formulation A: | |
| --- | --- |
| Polyol C | 45.00 |
| Polyol B | 45.00 |
| AA 1 | 1.18 |
| CAT 1 | 0.45 |
| CAT 2 | 0.15 |
| ADD 1 | 3.00 |
| ADD 2 | 5.00 |
| Pigment A | 1.00 |

-continued

| | |
|---|---|
| Gly | 2.00 |
| Polyol E | 3.50 |
| Water | 1.86 |
| TOTAL PARTS BY WT: | 108.14 |
| Formulation B: | |
| Polyol A | 59.50 |
| Polyol C | 18.50 |
| ADD 3 | 4.60 |
| Polyol E | 1.18 |
| Polyol G | 3.00 |
| Polyol D | 6.00 |
| Polyol H | 5.00 |
| Pigment A | 1.00 |
| CAT A | 0.02 |
| Water | 3.00 |
| TOTAL PARTS BY WT: | 101.8 |

Each isocyanate (Iso A, Iso B and Iso C) was mixed with Formulation A and with Formulation B, respectively, to form a foam. This was done using a hand mix procedure. The required amount of polyol formulation was weighed out and placed into a quart container. The correct quantity of the isocyanate (to provide an isocyanate index of 95 in each example) was added to the polyol formulation in the container and agitated form 5 to 7 seconds at 3000 RPM. The mixture was then poured into a maze mold where the reaction mixture was allowed to fully react.

The maze mold used in these examples corresponds to that described in the article entitled "A Response to Stringent Vinyl Staining Resistance Requirements" by R. G. Petrella and J. D. Tobias which appeared in the *Journal of Cellular Plastics*, Vol. 25, p 421, September 1989, the disclosure of which is hereby incorporated by reference.

After 5 minutes, the part was demolded. The parts by weight for the polyol formulations and the respective isocyanates at an isocyanate index of 95 was as follows:

Formulation A: 100 pbw

Iso A: 50.1 pbw

Iso B: 45.7 pbw

Iso C: 54.2 pbw

Formulation B: 100 pbw

Iso A: 59.1 pbw

Iso B: 56.7 pbw

Iso C: 65.9 pbw

Results

The maze mold was used to determine the flow of the polyol systems when molded with a specific isocyanate. Of specific importance, is the cell structure and amount of voiding exhibited in the third leg of the maze mold which can be related to improved processing in an instrument panel.

Results are assessed visually, by cutting the different areas of the maze molded foam to determine the quality of cell structure and the number and size of the voids contained in that area. Cell structure may range from very fine to a much coarser or ratty type of cell structure. It is desired that the cell structure be very fine.

The results of the maze mold tests are as follows:

The best cell structure and minimal voiding were obtained when molding Formulation B with Iso C. This improvement was also seen when molding Iso C with Formulation A, but to a lesser degree.

The examples were foamed in a maze mold because of the correlation between the behavior of polyurethane foams systems in a maze mold and in an instrument panel tool. The most critical problem. The formation of voids, can be observed in the maze mold as well as in an instrument panel tool. A polyurethane foam system which shows excessive voiding in a maze mold will also show that behavior in a real instrument panel tool. Therefore, the more simple lab procedure was used to exemplify the invention.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. In a process for the preparation of a molded semi-rigid formed polyurethane product comprising:

a) positioning a plastic film or sheet in a mold, b) spraying or pouring a polyurethane forming reaction mixture over said film or sheet in an amount sufficient to fill the mold, c) closing the mold, d) allowing said reaction mixture to fully react, and e) removing the resultant product from the mold, the improvement wherein said reaction mixture comprises A) an isocyanate reactive mixture comprising:
      i) from 70 to 95% by weight of at least one long chain polyether polyol,
      ii) from 1.5 to 4.0% by weight of water, and
      iii) from 0.5 to 15% by weight of at least one crosslinker, wherein said %s by weight are based upon the total weight of component A), and B) a polyisocyanate prepolymer having a functionality of less than about 2.8, an isocyanate group content of about 20 to about 30% by weight, and a urethane group content of from about 0.1 to about 3.2% by weight, and which comprises polymethylene poly (phenylisocyanate), from about 26 to about 52% of 4,4'-methylene bis(phenylisocyanate), and from about 8 to about 27% by weight of 2,2'- and 2,4'-methylene bis(phenylisocyanate), with the amounts of components A) and B) being such that the isocyanate index of the reaction is from 80 to 100.

2. The process of claim 1, wherein B) said polyisocyanate prepolymer has a functionality of from about 2.1 to less than about 2.8, and an isocyanate group content of from 26 to 29% by weight.

3. The process of claim 1, wherein B) said polyisocyanate prepolymer is prepared by mixing (i) polymethylene poly(phenylisocyanate) having a monomer content of about 45 to about 80% by weight, wherein from about 0 to about 3% is 2,2'-methylene bi(phenylisocyanate), from about 10 to about 25% is 2,4'-methylene bi(phenylisocyanate), and from about 33% to about 55% is 4,4'-methylene bi(phenylisocyanate);

with (ii) an organic compound contains an average of from 2.0 to 4.0 isocyanate-reactive groups.

4. The process of claim 3, wherein (ii) said organic compound contains an average of from 2.0 to 3.0 isocyanate-reactive groups and has a molecular weight of greater than or equal to 1,000.

5. The process of claim 1, wherein A)i) said long chain polyether polyol has an average functionality of from about 1 to about 6 and a molecular weight of from about 1,100 to about 8,000.

6. The process of claim 5, wherein A)i) said long chain polyether polyol has an average functionality of from about 2 to about 3, and a molecular weight of from about 4,000 to about 6,000.

7. In a process for the preparation of a molded semi-rigid formed polyurethane product comprising:
   a) positioning a plastic film or sheet in a mold,
   b) closing the mold,
   c) injecting a polyurethane forming reaction mixture between the retainer and the plastic film or sheet in an amount at least sufficient to fill the mold,
   d) allowing said reaction mixture to fully react, and
   e) removing the resultant product from the mold,
   the improvement wherein said reaction mixture comprises
   A) an isocyanate reactive mixture comprising:
      i) from 70 to 95% by weight of at least one long chain polyether polyol,
      ii) from 1.5 to 4.0% by weight of water, and
      iii) from 0.5 to 15% by weight of at least one crosslinker, wherein said %s by weight are based upon the total weight of component A),
   and
   B) a polyisocyanate prepolymer having a functionality of less than about 2.8, an isocyanate group content of about 20 to about 30% by weight, and a urethane group content of from about 0.1 to about 3.2% by weight, and which comprises polymethylene poly(phenylisocyanate), from about 26 to about 52% of 4,4'-methylene bis(phenylisocyanate), and from about 8 to about 27% by weight of 2,2'- and 2,4'-methylene bis(phenylisocyanate),
   with the amounts of components A) and B) being such that the isocyanate index of the reaction is from 80 to 100.

8. The process of claim 7, wherein B) said polyisocyanate prepolymer has a functionality of from about 2.1 to less than about 2.8, and an isocyanate group content of from 26 to 29% by weight.

9. The process of claim 7, wherein B) said polyisocyanate prepolymer is prepared by mixing
   (i) polymethylene poly(phenylisocyanate) having a monomer content of about 45 to about 80% by weight, wherein from about 0 to about 3% is 2,2'-methylene bi(phenylisocyanate), from about 10 to about 25% is 2,4'-methylene bi(phenylisocyanate), and from about 33 to about 55% is 4,4'-methylene bi(phenylisocyanate);
   with
   (ii) an organic compound contains an average of from 2.0 to 4.0 isocyanate-reactive groups.

10. The process of claim 9, wherein (ii) said organic compound contains an average of from 2.0 to 3.0 isocyanate-reactive groups and has a molecular weight of greater than or equal to 1,000.

11. The process of claim 7, wherein A)i) said long chain polyether polyol has an average functionality of from about 1 to about 6 and a molecular weight of from about 1,100 to about 8,000.

12. The process of claim 11, wherein A)i) said long chain polyether polyol has an average functionality of from about 2 to about 3, and a molecular weight of from about 4,000 to about 6,000.

13. In a process for the preparation of a molded semi-rigid formed polyurethane product comprising:
   a) positioning a plastic film or sheet in a mold,
   b) spraying or pouring a polyurethane forming reaction mixture over said film or sheet in an amount sufficient to fill the mold,
   c) closing the mold,
   d) allowing said reaction mixture to fully react, and
   e) removing the resultant product from the mold,
   the improvement wherein said reaction mixture comprises
   A) an isocyanate reactive mixture comprising:
      i) from 70 to 95% by weight of at least one long chain polyether polyol,
      ii) from 1.5 to 4.0% by weight of water, and
      iii) from 0.5 to 15% by weight of at least one crosslinker, wherein said %s by weight are based upon the total weight of component A),
   and
   B) an isocyanate prepolymer having an isocyanate group content of from 20 to 30% by weight, prepared by
      i) mixing
         1) 4,4'-methylene bis(phenyl isocyanate) with
         2) a polymethylene poly(phenyl isocyanate) having an isocyanate group content of from 31 to 32.5% by weight and consisting of:
            a) from 10 to 25% by weight of 2,4'-MDI,
            b) from 0 to 3% by weight of 2,2'-MDI,
            c) from 33 to 55% by weight of 4,4'-MDI and
            d) from 27 to 55% by weight of higher homologues of MDI,
            with the total weight of a), b), c) and d) being 100%, and
         wherein the mixture of components 1) and 2) has an isocyanate group content of from 31.5 to 33% by weight, and
      ii) reacting the mixture of step B)i) with
         3) a polyether polyol having an average hydroxyl functionality of from 2 to 4 and an OH number of from 20 to 100,
   with the amounts of components A) and B) being such that the isocyanate index of the reaction mixture is from 80 to 110.

14. The process of claim 13, wherein B)i)2) said polymethylene poly(phenylisocyanate) consists of:
   a) from 14 to 22% by weight of 2,4'-MDI,
   b) from 1 to 2.5% by weight of 2,2'-MDI,
   c) from 33 to 47% by weight of 4,4'-MDI, and
   d) from 32 to 45% by weight of higher homologues of MDI, with the total weight of a), b), c) and d) being 100%.

15. In a process for the preparation of a molded semi-rigid formed polyurethane product comprising:
   a) positioning a plastic film or sheet in a mold,
   b) closing the mold,
   c) injecting a polyurethane forming reaction mixture between the retainer and the plastic film or sheet in an amount at least sufficient to fill the mold,
   d) allowing said reaction mixture to fully react, and
   e) removing the resultant product from the mold.
   the improvement wherein said reaction mixture comprises
   A) an isocyanate reactive mixture comprising:
      i) from 70 to 95% by weight of at least one long chain polyether polyol,
      ii) from 1.5 to 4.0% by weight of water, and
      iii) from 0.5 to 15% by weight of at least one crosslinker, wherein said %s by weight are based upon the total weight of component A),
   and
   B) an isocyanate prepolymer having an isocyanate group content of from 20 to 30% by weight, prepared by i) mixing
  1) 4,4'-methylene bis(phenyl isocyanate) with
  2) a polymethylene poly(phenyl isocyanate) having an isocyanate group content of from 31 to 32.5% by weight and consisting of:
     a) from 10 to 25% by weight of 2,4'-MDI,
     b) from 0 to 3% by weight of 2,2'-MDI,
     c) from 33 to 55% by weight of 4,4'-MDI and
     d) from 27 to 55% by weight of higher homologues of MDI,
     with the total weight of a), b), c) and d) being 100%, and
  wherein the mixture of components 1) and 2) has an isocyanate group content of from 31.5 to 33% by weight, and
ii) reacting the mixture of step B) i) with
  3) a polyether polyol having an average hydroxyl functionality of from 2 to 4 and an OH number of from 20 to 100,
  with the amounts of components A) and B) being such that the isocyanate index of the reaction mixture is from 80 to 110.

16. The process of claim 15, wherein B)i)2) said polymethylene poly(phenylisocyanate) consists of:
  a) from 14 to 22% by weight of 2,4'-MDI,
  b) from 1 to 2.5% by weight of 2,2'-MDI,
  c) from 33 to 47% by weight of 4,4'-MDI, and
  d) from 32 to 45% by weight of higher homologues of MDI,
  with the total weight of a), b), c) and d) being 100%.

* * * * *